United States Patent [19]

Arvanitakis

[11] 3,985,656

[45] Oct. 12, 1976

[54] FILTER CLEANING APPARATUS

[76] Inventor: Kostas Savas Arvanitakis, 14945 S. Dogwood Ave., Orland Park, Ill. 60462

[22] Filed: Apr. 29, 1974

[21] Appl. No.: 465,116

[52] U.S. Cl. .............................. 210/327; 210/334; 210/396
[51] Int. Cl.² ......................................... B01D 33/26
[58] Field of Search ........... 210/327, 330, 334, 396, 210/408

[56] References Cited
UNITED STATES PATENTS

| | | | |
|---|---|---|---|
| 1,350,433 | 8/1920 | Atkins et al. | 210/327 |
| 1,702,192 | 2/1929 | Blomfield et al. | 210/408 X |
| 2,269,725 | 1/1942 | Malanowski | 210/327 |
| 2,621,798 | 12/1952 | Kracklau | 210/327 |
| 2,799,397 | 7/1957 | Berline | 210/327 X |
| 3,371,791 | 3/1968 | Schryver | 210/327 |
| 3,497,452 | 2/1970 | Arvanitakis | 210/327 X |
| 3,643,806 | 2/1972 | O'Cheskey | 210/327 |

FOREIGN PATENTS OR APPLICATIONS 44,888  9/1961  Poland ............................ 210/327

*Primary Examiner*—Charles N. Hart
*Assistant Examiner*—R. H. Spitzer
*Attorney, Agent, or Firm*—FitzGibbon, Roehrig, Greenawalt & Stone

[57] ABSTRACT

An apparatus for removing matter accumulated on a filter element, rotatable about a central axis, having an arm portion mounted at an angle relative to the radii extending from the central axis of the filter element and in a stationary position relative thereto. The arm portion supports a flexible means for engaging a surface of the filter element as the element is rotated relative to it to frictionally remove the accumulated matter from the surface. The arm and flexible means are preferably curved outwardly toward the periphery of the filter element to facilitate outward removal of matter while maintaining the integrity of the surface of the filter element.

3 Claims, 8 Drawing Figures

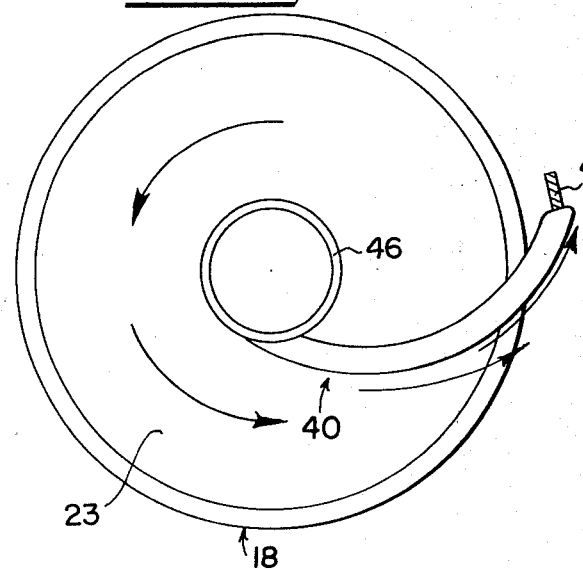
FIG_3_
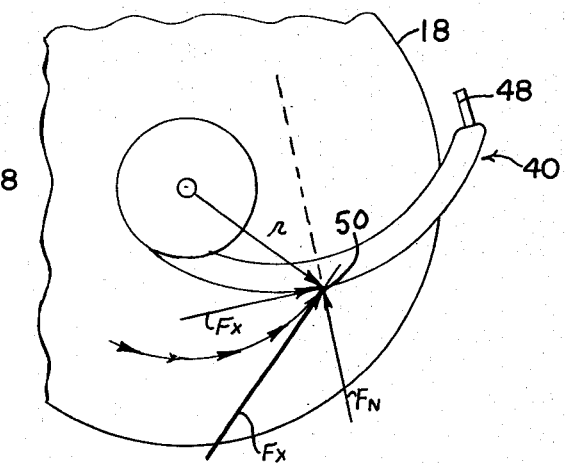
FIG_5_
FIG_4_
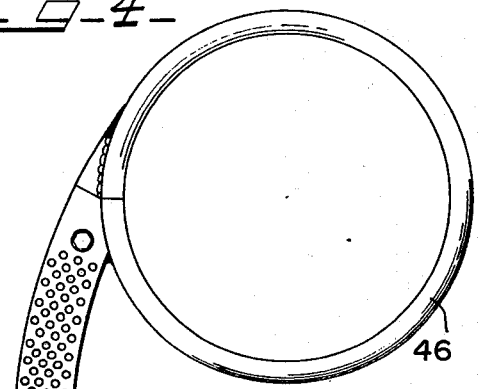
FIG_6_  FIG_7_
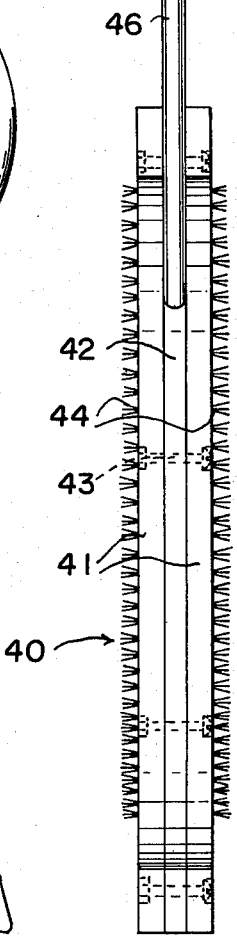
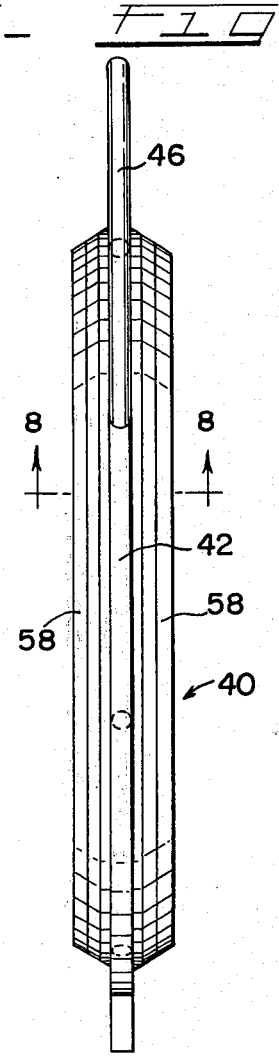
FIG_8_
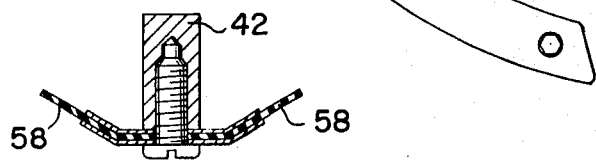

FILTER CLEANING APPARATUS

BACKGROUND OF THE INVENTION

This invention relates to cleaning filtration systems and, more specifically, to a mechanical apparatus for use in a filtration system having horizontally disposed filter elements to remove expended filter cake from the filter elements or septum.

Various types of filtration systems exist for clarifying liquids by removing solid particles (whether initially dissolved or suspended therein) and chemical contaminants, as well as to recover reclaimable materials from the liquid. These systems employ mechanical screening devices utilized as a support for a chemically adsorptive/absorptive material such that the solid and the chemical contaminants are adsorbed/absorbed by the surface of this material while the liquid passes through. As the contaminants are removed from the liquid, however, they accumulate on the surface of the filter as sludge, inhibiting the flow of the liquid therethrough, and eventually clogging the filter and necessitating the removal of the filter material or cake from the supporting screen or filter septum.

In such filtration systems, therefore, various filter cleaning means, such as brushes, scrapers and/or sprayers are used to mechanically remove the filter material or filter cake and sludge from the filter septum or screen. Other methods employed to remove spent filter cake and sludge from the filter elements, filter leaves, or circular filter tubes are vibration and backwashing, i.e., reversal of the liquid flow through the filter elements. However, backwashing is detrimental to the filter and reduces its life considerably, since most filters are constructed of fine mesh screen septums supported on the low pressure side which will distend and easily distort when subjected to pressure from that side. Vibration will also harm the support screen over a period of time.

In many applications, where the flow rate of liquid through the filter is slow, the filter cake has a tendency to fall from the septum where vertically disposed filters are used. Therefore, such applications require the use of horizontally disposed filter elements which cannot be easily cleaned by vibration or backwashing. Rotating such horizontal filters as high rates of speed to remove spent filter cake and sludge by centrifugal force often results in the septum being torn from the support material along with the expended filter cake which will require shutting down the operation to replace the filter element. Where the filter cake is strongly bonded to the septum, the entire cake may not be removed by centrifugal force, thereby resulting in the formation of uneven cake upon subsequent precoating of the filter septum.

Where brushes and scrapers have been used on horizontally disposed filters it has been found that as the filter is rotated against these radially extending brushes, filter cake and sludge accumulate or pile up, not only creating frictional forces which resist further movement, but also downward forces against the filter screen which tend to damage it permanently or force filter cake through the septum contaminating the clarified liquid. The resulting cleaning is unsatisfactory.

The above-mentioned methods are not efficient and do not maintain the outer surface of a filter element completely clean for long periods of time, which may result in the septum becoming slimed, blinded, or clogged. If the filter elements are only partially cleaned, the efficiency of the filtration process and the period in which the filter is in service and on line is substantially reduced.

SUMMARY OF THE INVENTION

The present invention is an apparatus for cleaning filter elements in a filtration system, particularly those having filtering surfaces horizontally disposed for rotation about a central axis. This invention uniformly and thoroughly removes spent filter cake and accumulated solid waste particles and chemical contaminants from the filter septum without damaging the filter or requiring that the system be shut down for cleaning. This invention overcomes the disadvantages of the prior art by supporting a mechanical cleaning device which includes a support arm, at an angle relative to radii extending from the central axis about which the filter elements are rotated and opening in the direction of rotation to extend across and parallel to the surface of a filter, with a flexible brush mounted on this arm to engage the filter surface. As the filter element is rotated against this brush, spent filter cake and sludge are dislodged from the mesh or septum and swept outwardly off of the filter element. The cleaning apparatus also wipes away any matter which might blind and clog the wire mesh filter element and thereby prevents any inorganic or organic matter in gelatinous, molecular or colloidal form from forming or accumulating on the wire mesh and reducing the efficiency of the filter.

The installation of the support arm of the cleaning means at an angle relative to radii extending from the central axis of rotation of the filter element and opening in the direction of rotation causes the arm and its associated brush to create a plowing force through the filter cake while the filter element is being rotated. This disposition of the cleaning means and the preferred curvilinear configuration of the support arm creates an outwardly directed force which causes a flow of sludge outwardly from the center toward the outer peripheral edge of the filter element to fall off the element to the bottom of the filter apparatus for disposal. This movement is particularly important in horizontal filters where gravitational forces do not assist in removing sludge from the top of the filter element.

If the brush were installed radially, relative to the center of rotation of the filter element, the removed cake and sludge would stick and bridge on the arm and brush, thereby preventing rotation of the filter assembly and possibly damaging the wire screen septum.

Accordingly, it is an object of the present invention to effectively and efficiently remove spent filter cake and sludge from a filtering surface of the element without damaging the element itself.

It is another object of the present invention to wipe gelatinous or colloidal suspensions from the surface of the filter element to aid in forming successive filter cakes on the element and avoid clogging of the filter.

It is a further object of the present invention to provide a generally flexible filter brush which is disposed tangentially relative to the axis of rotation of a filter element to direct removed sludge toward the outer edge of the filter element during cleaning.

It is one more object of the present invention to provide a filter brush which is curvilinear in configuration to reduce the stresses on the filter element and assist in removing spent filter cake and sludge from the surface of the filter during cleaning by the brush.

These and other objects of the present invention will become more apparent from the following description taken in conjunction with the drawings wherein:

FIG. 3 is a top plan view of a filter element and cleaning apparatus of the present invention;

FIG. 4 is a top plan view of the cleaning apparatus of the present invention alone;

FIG. 5 is a side elevational view of the cleaning apparatus shown in FIG. 4;

FIG. 6 is a simulated force diagram illustrating typical forces exerted on the cleaning apparatus of this invention during operation;

FIG. 7 is a side elevational view of a modified form of the cleaning apparatus of the present invention; and, FIG. 8 is a vertical, cross-sectional view of the cleaning apparatus shown in FIG. 7.

Figure 1:
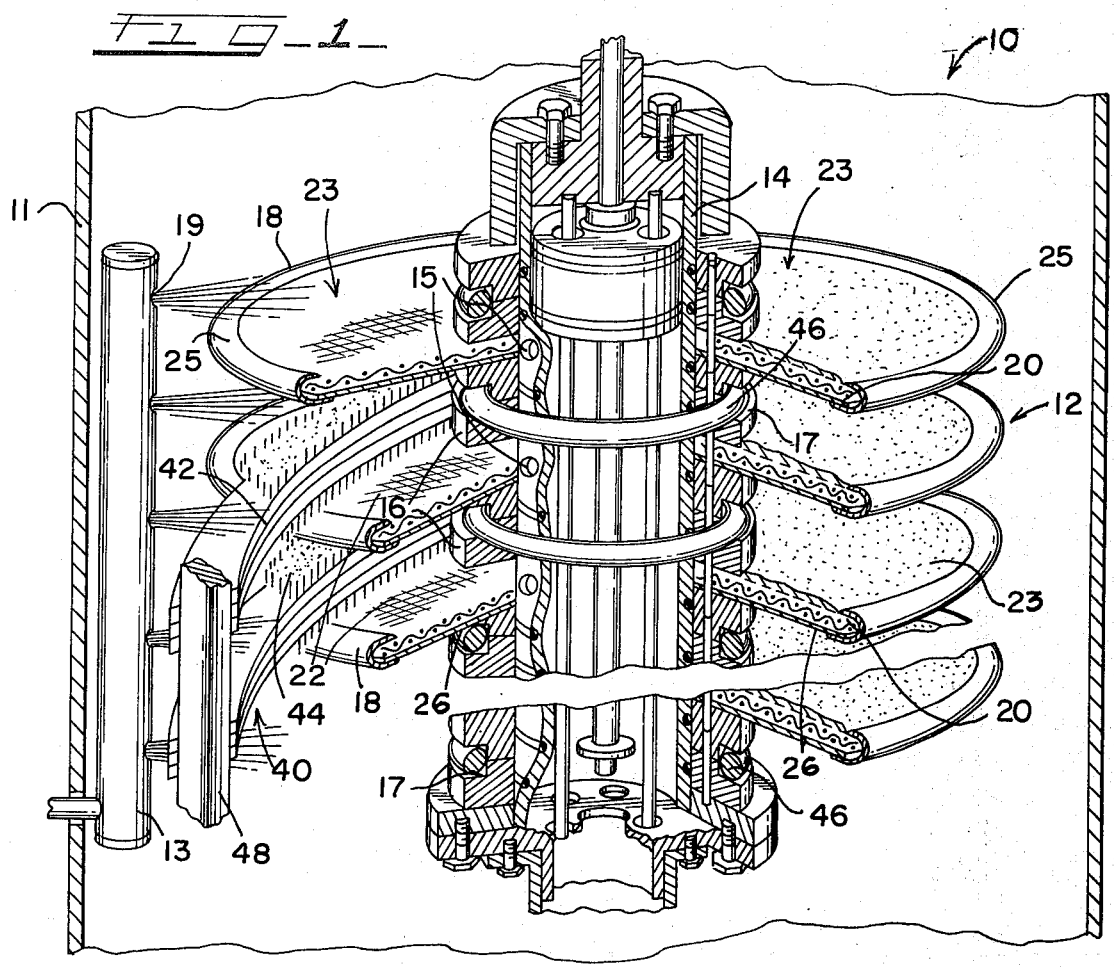
FIG. 1 is a perspective view of a portion of a filtration apparatus having horizontally disposed filter elements, cut away to show the structure and orientation of the present invention with respect to the apparatus.

Referring now to the drawings and, in particular, to FIG. 1, a portion of a filtration system containing the filter cleaning apparatus of the present invention is shown in general at 10. This filtration system 10 includes a horizontal filter mechanism 12, mounted within a filter chamber 11 and having a central, hollow mounting and filter tube 14 extending in a generally vertical manner, which has a series of vertically spaced openings 15 formed about its circumference. A plurality of relatively flat, radially extending filter elements 18 are mounted in vertically spaced relationship on filter tube 14, the interior of each of the elements being aligned with a set of the circumferential openings 15. Elements 18 are maintained in this relationship by intervening spacers 16 mounted on and adjacent the filter tube 14. Positioned adjacent the periphery of the filter element 18 is a spray inlet 13 which is a vertical post having a number of spray openings 19 through which clarified liquid may be sprayed over each filter element 18 and cleaning means 40, as will be explained in more detail below.

In general, the unclarified liquid entering into the horizontal filter mechanism 12 through an appropriate inlet (not shown) is clarified by the horizontally disposed filter elements 18 and passes through the openings 15 into the hollow center of tube 14 to a filter outlet (not shown) from whence it can be recycled, disposed of, or passed to a precoating system, depending upon the particular phase cycle in which the filtration apparatus is operating. A complete disclosure of a filtration apparatus in which the present invention may be used is set forth in co-pending application, Ser. No. 448,493, entitled "Method and Apparatus for Liquid/Solid Separation", filed in the United States Patent Office on Mar. 6, 1974, in the name of Kostas Savas Arvanitakis, the disclosure of which application is completely incorporated herein by reference thereto.

The hollow mounting and filter tube 14 is rotatably mounted in sealed bearing housings at its upper and lower ends (not shown) so that it may be rotated, along with the filter elements, when the filter cake has been expended and cleaning of the filtration system is desired.

Each filter element 18 is mounted coaxially on the tube 14 and separated from an adjacent element by spacers 16. Each spacer 16 is formed with an outwardly facing groove 17 formed therein to receive a supporting arm ring 46, as will be explained below. Each filter element includes a support structure 20 formed from a flat sheet of material folded in an accordian-like fold radiating outward from the center of the element and tapering to a point at the outer edge, or a heavy gauge mesh. This support structure is covered with a fine mesh screen or septum 22 to support a top filter cake surface 23 formed on the septum. The fine mesh screen or septum 22 covering the support structure 20 is of a mesh size which may be varied depending upon the size of the particular solid particles suspended in the liquid which are to be filtered. The lower side of the filter element 18 is closed by a solid metal plate 26 such that liquid forced downwardly through the top filter surface 23 of the filter element 18 flows radially inwardly toward an opening 15 in tube 14 with which the interior of the filter elements are each vertically aligned and in communication. The metal plate 26 may be bent upwardly and crimped over the mesh 22 or joined to the mesh by a U-shaped edge 25 to seal the outer periphery of the filter elements 18. In many applications, several filter elements 18 are mounted between adjacent spacers 16 about the tube 14 for rotation with tube 14 in response to a drive means (not shown) connected to the tube 14 to impart a rotation thereto.

According to known procedures, the top filter surface, or the mesh screen 22, of the filter element 18 is precoated with an additive material, such as diatemaceous earth, which will act, with the liquid, to form a filter cake 23 on the septum 22. The filter cake 23 has very fine interstices which allow the liquid portion to pass through but block the passage of solids or other contaminating materials, causing such solids to accumulate on the filter cake. When sufficient solids have accumulated, or the pores of the filter cake 23 have become so clogged that the filter efficiency is reduced, it is necessary to remove the accumulated mass and spent filter cake for further treatment and disposal. As described above, such removal has been a problem to the present time, particularly where horizontal filters are used.

In this invention, this removal is achieved by a plurality of cleaning means 40 which correspond to the number of filter elements 18 used, and are located such that they extend across and are generally parallel to the top filter surface 23 of each filter element 18. Each cleaning means 40 includes an arm portion 42 which has its inward end mounted on a support ring 46. This ring 46 is mounted in the groove 17 formed in the spacer 16, as described above. Ring 46, however, is so mounted in groove 17 to allow relative movement between the spacer 16 and the ring 46 with a minimum of friction. Unlike previous filter brushes, the inward end of arm portion 42 of cleaning means 40 is mounted such that the projection at the intercept does not go through the central axis of the filter elements, as shown in FIGS. 3–5. Since the ring is coaxial with the filter elements, spacers and mounting tube 14, the cleaning means 40 will be therefore be similarly located with respect to the central axis of these elements and, as shown, tangentially to the support ring 46. Each cleaning means 40 will extend on a bias or angle other than parallel to radials from the central axis of each filter element 18. The inward end of the arm portion 42 of each cleaning means 40 may be butt-welded to the outside circumference of ring 46 to achieve solid attachment. The opposite end of the arm portion 42 will abut a vertical stop bar 48, located beyond the outer edge of the filter elements, which prevents the cleaning means 40 from moving during rotation of the filters. Such abuttment, rather than solid attachment, facilitate rapid disassembly of the unit, if necessary.

Figure 2:
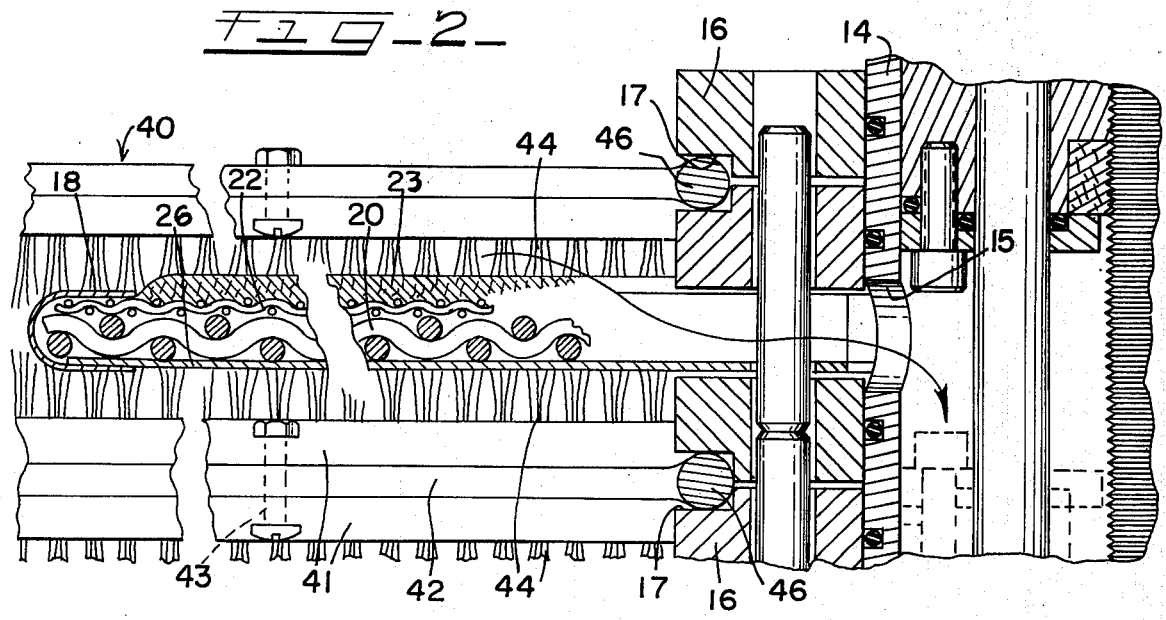
FIG. 2 is an enlarged cross-sectional view of a portion of a filter element and a cleaning apparatus of the present invention as shown in FIG. 1.

In the preferred embodiment of this invention, arm portion 42 of the cleaning means 40 is curvilinear in configuration. It has been discovered that such a configuration allows rapid removal of the mass of filter cake and filtered matter off the surface of the filter element 18 quickly and consequently without any damaging forces being exerted on the sensitive mesh screen 22 due to pile up of filter aid and filtered matter, which would normally occur through the use of a brush extending radially from the axis of rotation. The complete removal of spent filter cake and sludge made possible by use of the curved cleaning means of this invention also allows a thorough cleaning of the filter septum to eliminate gelatinuous foreign matter, which might otherwise blind or clog the filter element mesh 22. Such removal is mechanically accomplished by a plurality of brush fibers or bristles 44 which are fixed in brush arms 41 attached to opposite sides of arm portion 42 of cleaning means 40 by bolts 43. Thus, brush fibers 44, as shown in FIG. 2, extend from the lower side of each arm portion 42, into contacting relationship with the filter cake 23 and septum 22 of the below adjacent filter element 18 with a sufficient force, when the filter element is rotated relative to fibers 44, to break the static friction force between the filter cake and solids 23 from the septum 22 and thus move it radially to the edge of the disk causing the removed cake to fall off the septum. After the expanded filter cake is removed, the brushes scrub the septum. The fibers 44 mounted on the opposite or upper side of arm portion 42 will sweep the lower side 26 of the above adjacent filter element 18 to prevent accumulation of solids thereon or bridging of solids, i.e., the tendency of solids to pile up above the arm portion and overflow it.

It is believed that the reason the present invention, having the cleaning means carried at an angle other than parallel to radials from the central axis, operates successfully to thoroughly clean a horizontal filter element where prior devices using radially-disposed brushes and scrapers have failed, can best be explained as follows, with reference to FIG. 5.

Following filtration, a mass or layer of expended filter cake and accumulated sludge 23 is present on the septum 22 of filter element 18. For purposes of explanation, this layer will be assumed to consist of a discrete number of unitary masses (e.g., 50) located at various radial distances (e.g., $r$) from the central axis of filter element 18. To remove these waste masses, the filter element 18 is rotated relative to the cleaning means 40 at a constant angular velocity. In linear terms, a vectorial force $F_x$ is exerted by each filter cake mass on and opposed by the cleaning means at each radial distance. $F_x$ can be broken down into a normal ($F_n$) and tangential ($F_t$) component at each point. $F_n$ is the force applied to the cleaning means which passes through its center of curvature, and $F_t$ is the force which is applied tangentially to the cleaning means by the unitary mass at its point of contact with the cleaning means, i.e., perpendicular to the radius of curvature of the cleaning means at that point. The force $F_n$ at each point is the force applied to the unitary mass by the cleaning means which is used to remove or "lift" the mass from the filter septum 22, while $F_t$ is the force applied to each mass which acts to urge it along the cleaning means outwardly from the center of rotation and off the filter element to avoid the pile up of filter cake and filtered material on the filter septum along the face of the cleaning means, and consequent or potential damage to the septum. The angle between the tangential surface of the cleaning means relative to radials from the central axis is varied so that the component of change of direction of filter cake and filtered material in the radial direction further from the central axis is sufficient to clear the way before such material closer to the central axis catches it and causes pile up.

It is seen that because of the unique curvilinear configuration of the cleaning means, opening in the direction of rotation of filter element 18, the upward component $F_t$, which pushes mass 52 outwardly is believed to be the greatest at the outer edge of element 18. When the filter element is rotated for cleaning, this curvilinear cleaning means creates a plowing force on the filter cake. Optimally, the radius of curvature of cleaning means 40 should be such that $F_t$ is approximately equal to or greater than $F_n$ at each point therealong. The degree of curvature of the cleaning means should also be determined by the typical amount of filter cake and sludge to be removed in a particular application, the curvature increasing with the amount, and also with the speed of rotation of the filter element.

While a straight arm portion 42 will also perform the same function as a curvilinear arm, if carried at an angle relative to the radii of the filter element and opening in the direction of rotation, the force $F_t$ urging the masses of sludge particles outward will not be as great at specific points as those resulting from the use of a curvilinear brush, and therefore, a straight brush will not be as effective to accomplish the result desired. Either form of cleaning means should be positioned at an angle to the radii so that it opens in the direction of the rotation of the filter element forming an acute angle with the outer edge of the filter element surface, so that when the element is rotated in the same direction as the opening of the angle of the cleaning means a flow of sludge toward the outer edge of the filter apparatus and outer wall of the filter will be created to remove the sludge from the element allowing it to fall to the bottom of the filter for disposal.

As shown in FIGS. 7 and 8, the bristles 44 on opposite sides of the arm portion 42 of the cleaning means 40 may be replaced by opposite, continuous, flexible wiper blades 58 mounted above and below arm portion 42' of cleaning means 40', which will also engage the surfaces of the filter elements. This wiper 58 may be formed of any suitable material such as polytetrafluoroethylene, sold under the trademark "TEFLON" by DuPont, having a high inherent lubricity and being easy to clean. The bristles 44 may likewise be formed from a synthetic fiber which is strong, resilient, and easy to keep clean, such as nylon.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

I claim:

1. An apparatus for cleaning filter elements by removing undesirable materials such as sludge, spent filter cake and gelatinous matter from the filtering surfaces of such elements without damaging the filter element or reducing its filtering efficiency, including curvilinear cleaning means supported across and generally parallel to a surface of a filter element having materials to be removed accumulated thereon, said cleaning means having a relatively flexible portion to engage said surface of said filter element in an angular manner across said surface and an arm portion on which said flexible portion engaging said surface of said filter element is mounted, said flexible portion of said cleaning means including a plurality of flexible bristles mounted on said arm portion to form a brush which may be disposed to engage said surface of said filter element, and said arm portion extending across a portion of said surface of said filter element such that during relative movement of said filter element and said cleaning means to clean said surface of said filter element and flexible portion of said cleaning means will engage said surface of said filter element at an acute angle relative to the radials therefrom opening in the direction of movement of said filter element at the point of intercept to thereby cause said accumulated materials on said surface of said filter element to be removed from said surface of said filter element by said flexible portion of said cleaning means while being urged toward said outer edge of said surface by the disposition of said cleaning means relative to said filter element.

2. In an apparatus for removing solid particles and chemical contaminants from solutions by filtration, including generally horizontal filter means mounted for rotation on a mounting tube, said filter means being rotatable about a central axis concentric with a central axis of said tube for cleaning, said filter means having a filtering surface designed to support a filtering medium preventing passage of undesirable solid particles and chemical contaminants contained in said solution such that said particles and contaminants will accumulate on said filtering surface, and cleaning means for removing said accumulated particles, contaminants and spent filtering medium from said filtering surface, the improvement comprising curvilinear cleaning means including an arm portion having one end mounted on said tube tangentially to the central axis of said filter means, a flexible portion mounted on said arm portion including a plurality of flexible bristles mounted on said arm to form a brush, and said cleaning means extending across and generally parallel to said filtering surface of said filter means in a manner such that the flexible bristles forming a brush will engage said filtering surface of said filter means in an angular manner to assist in the removal of said particles, contaminants, and filtering medium from said surface.

3. In an apparatus for removing solid particles and chemical contaminants from solutions by filtration, including generally horizontal filter means mounted for rotation on a mounting tube, said filter means being rotatable about a central axis concentric with a central axis of said tube for cleaning, said filter means having a filtering surface designed to support a filtering medium preventing passage of undesirable solid particles and chemical contaminants contained in said solution such that said particles and contaminants will accumulate on said filtering surface, and cleaning means for removing said accumulated particles, contaminants and spent filtering medium from said filtering surface, the improvement comprising a plurality of filter elements mounted on said mounting tube, each of said filter elements having cleaning means associated therewith, said cleaning means comprising a curvilinear arm portion having one end mounted on said tube tangentially to the central axis of said filter elements, a flexible portion mounted on said arm portion including a plurality of flexible bristles mounted on said arm to form a two sided brush, said cleaning means extending across and generally parallel to said filtering surface of said filter elements in a manner such that the flexible bristles forming a brush will engage said filtering surface of said filter elements in an angular manner to assist in the removal of said particles, contaminants, and filtering medium from said surface, said filter elements being spaced from one another by spacer means mounted on said mounting tube, and said filter elements, said mounting tube and said spacer means being movable relative to said cleaning means such that the flexible bristles forming the two-sided brush engage an upwardly facing filtering surface of one filter element and a downwardly facing surface of an adjacent filter element, respectively, to assure complete cleaning of the filter elements and to prevent bridging of the removed material on the filtering surfaces thereof.

* * * * *

UNITED STATES PATENT OFFICE
CERTIFICATE OF CORRECTION

Patent No. 3,985,656     Dated  October 12, 1976

Inventor(s)     Kostas Savas Arvanitakis

It is certified that error appears in the above-identified patent and that said Letters Patent are hereby corrected as shown below:

Column 1, line 46, "as" should read -- at --.

Column 5, line 34, "expanded" should read -- expended --.

Signed and Sealed this

Twenty-second Day of March 1977

[SEAL]

Attest:

RUTH C. MASON
*Attesting Officer*

C. MARSHALL DANN
*Commissioner of Patents and Trademarks*